(12) United States Patent
Uhlmann

(10) Patent No.: US 11,264,857 B2
(45) Date of Patent: Mar. 1, 2022

(54) STATOR FOR AN ELECTRIC MOTOR

(71) Applicant: AUDI AG, Ingolstadt (DE)

(72) Inventor: Philipp Uhlmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 141 days.

(21) Appl. No.: 16/583,626

(22) Filed: Sep. 26, 2019

(65) Prior Publication Data

US 2020/0153306 A1    May 14, 2020

(30) Foreign Application Priority Data

Nov. 12, 2018 (DE) .......................... 102018219219.7

(51) Int. Cl.
| | |
|---|---|
| *H02K 3/34* | (2006.01) |
| *H02K 9/19* | (2006.01) |
| *H02K 1/16* | (2006.01) |
| *H02K 3/22* | (2006.01) |

(52) U.S. Cl.
CPC .............. *H02K 3/34* (2013.01); *H02K 1/16* (2013.01); *H02K 3/22* (2013.01); *H02K 9/19* (2013.01)

(58) Field of Classification Search
CPC .. H02K 3/34; H02K 1/16; H02K 3/22; H02K 9/19; H02K 3/24
See application file for complete search history.

(56) References Cited

U.S. PATENT DOCUMENTS

| | | | | |
|---|---|---|---|---|
| 4,994,700 A | * | 2/1991 | Bansal | H02K 3/24 310/215 |
| 5,099,159 A | * | 3/1992 | Liptak | H02K 3/34 310/45 |
| 2003/0001441 A1 | * | 1/2003 | Peterson | H02K 3/24 310/59 |
| 2014/0300220 A1 | * | 10/2014 | Marvin | H02K 3/24 310/54 |

FOREIGN PATENT DOCUMENTS

| | | |
|---|---|---|
| CN | 1042628 A | 5/1990 |
| CN | 106464055 A | 2/2017 |
| DE | 1017265 B | 10/1957 |
| DE | 102012217711 A1 | 4/2014 |
| DE | 102014017745 A1 | 6/2016 |
| JP | 201351030 A | 3/2013 |
| JP | 201878764 A | 5/2018 |
| WO | 2007128275 A1 | 11/2007 |

OTHER PUBLICATIONS

Examination Report dated Jun. 20, 2019 in corresponding German application No. 102018219219.7; 16 pages.
Office Action dated Sep. 3, 2021, in connection with corresponding Chinese Application No. 201911093107.4 (13 pp., including machine-generated English translation).

* cited by examiner

*Primary Examiner* — Naishadh N Desai

(74) *Attorney, Agent, or Firm* — Maier & Maier, PLLC

(57) ABSTRACT

A stator for an electric motor, including a stator ring with slots arranged on the inner or the outer circumference, wherein each slot accommodates a plurality of conductors (Continued)

extending along the slot and having a rectangular cross-section, each of which is covered by an insulation layer, wherein to form a channel through which a coolant can flow, the insulation layer of at least one of the conductors has at least one recess extending along the conductor.

17 Claims, 3 Drawing Sheets

STATOR FOR AN ELECTRIC MOTOR

FIELD

The invention relates to a stator for an electric motor, comprising a stator ring with slots arranged on the inner or the outer circumference, wherein accommodated in each slot is a plurality of conductors having a rectangular cross-section and extending along the slot, each conductor being covered by an insulation layer.

BACKGROUND

The active part of an electric motor consists basically of a stationary part, called the stator, and a moving part, called the rotor. The stator contains conductors which, with suitable energization, generate a rotating magnetic field. Through an interaction with the rotor, the stator exerts a force on the rotor, causing the rotor to move. For this purpose, the stator has a stator ring, which has slots arranged on the inner or the outer circumference, depending on the type of electric motor, with the conductors being introduced into the slots that extend along the stator, parallel to its longitudinal axis. These conductors may be introduced into the slots as windings, for example, and may be wound around the stator teeth. This requires a large number of individual production steps. The central process involves introducing the copper conductors or the wound copper coils into the stator ring, which typically consists of a laminated core. Common methods for this process include the needle winding technique and the pull-in technique. In this production or winding technique, conductors that are round in cross-section are used.

One alternative to these techniques is the so-called "hairpin" technology, in which rather than round wire conductors, profiled wire conductors having a rectangular cross-section are inserted into the stator slots. This conductor geometry allows a higher conductor or copper fill factor to be achieved in the individual slots. For this purpose, the profiled wire conductors are first bent from a rectangular wire outside of the stator into the appropriate shape, which resembles the shape of a hairpin, and hence the name. Typically, 2-10 conductors are inserted per slot. Insulated wires are used as the conductors, i.e., an insulation layer is applied to the copper core. This may be either a lacquer that is applied, or a plastic layer that is extruded onto the wire. Depending upon the desired insulation class, this plastic layer may be composed of PEEK, PPS, or some other insulation plastic, for example.

During operation, the energization of the conductors causes them to become heated. The heat must be dissipated, which in a "dry motor" typically occurs from the copper wire through the wire insulation layer, a slot base insulation layer that insulates the slot base, the laminated core, and a cooling jacket to a cooling medium, i.e., a heat sink. Thus, the cooling path is long, and cooling at times is not particularly effective. However, the steady performance of an electric motor is directly dependent upon its potential cooling efficiency, i.e., effective and thorough cooling is one of the most important features of an electric motor.

From WO 2007/128275 A1, an electric motor having a stator is known, the slots of which accommodate rectangular conductors. To enable direct cooling in the conductor bundle, the conductors themselves are provided with a coolant bore, which forms a channel.

SUMMARY

The invention thus addresses the problem of specifying a stator that enables improved cooling.

To solve this problem, in a stator of the aforementioned type it is provided according to the invention that the insulation layer of at least one of the conductors has at least one recess extending along the conductor to form a channel through which a coolant can flow.

The stator configuration according to the invention enables one or more coolant channels, depending upon the embodiment, to be formed in a simple manner directly in the conductor bundle itself. The insulation layer is structured accordingly for this purpose by having at least one recess extending along the conductor, and defining the channel through which coolant can flow. In the slots, which extend axially along the stator ring and run radially in terms of their depth, the rectangular conductors are arranged radially in succession. In one slot, for example, four or six or more such rectangular conductors are inserted in succession, however said conductors are insulated from one another by their respective insulation layers, and are also insulated from the stator itself, which is typically covered in the slot by an additional insulation layer. If the insulation layer of one or more of the conductors is then embodied as having a corresponding recess, the insulation layer recess can define and delimit a channel either with an adjacent insulation layer of an adjacent conductor or with an adjacent component, or in this case, the slot base insulation layer of the stator slot. In any case, a fluid-tight coolant channel running along the stator, through which a coolant can be conducted, is formed by the recess in the insulation layer. This results in an extremely high packing density within the slot, since the conductor geometry is adapted in terms of width and thickness to the slot geometry, while at the same time enabling, in spite of everything, a cooling capacity directly in the conductor bundle, in that one or more such cooling channels are integrated therein. Depending upon the number of conductors that are packed into the slot, and the number of conductors that are provided with a recess, a corresponding plurality of channels distributed over the slot cross-section can naturally be defined.

The one or more channels are of course connected on the input and output sides to a corresponding coolant line, so that a defined flow of cooling fluid can be realized. The transfer of heat thus takes place here directly in the region of the heat source itself, so that the heat from the conductor as a heat source is conducted only through the insulation layer, and is then delivered directly to the cooling medium, i.e., the heat sink. Compared with the previous method of cooling, this results in substantially more efficient cooling, which is beneficial to the performance and the efficiency of an electric motor having a stator according to the invention.

As described, the insulation layer of the conductors (the same also applies to the slot base insulation layer of the stator slot) may be either a lacquer or, preferably, an insulation layer that is extruded on, made of an insulating plastic. Particularly in the case of the extruded insulation layer, the formation of a corresponding recess is particularly easy, since the recess can be produced during the extrusion process by an extrusion die that is configured or shaped accordingly. However, even if the coating is a viscous lacquer that cures, a corresponding recess can be realized by applying the lacquer locally in a thinner coating than is applied in the surrounding areas, in order to form the recess.

As described, multiple conductors can each have at least one recess for forming a plurality of longitudinal channels, so that a plurality of channels can be formed, distributed over the slot cross-section. Of course, the more channels that are provided, the greater the total effective cooling cross-section and the more heat transfer zones for the coolant are present.

As described, a channel can be formed between two adjacent insulation layers of two adjacent conductors, in which case, since the rectangular conductors are introduced quasi in succession in the slot, when a plurality of conductors are formed, they follow one another in sequence radially outward. Alternatively or additionally, it is also conceivable for the channel or channels to be formed between the insulation layer or a slot insulation layer that lines the slot. In that case, therefore, the one or more recesses is/are located on the sides of the conductors, which lie adjacent to or bordering on the slot insulation layer. This means that various interface regions are provided, at or between which channel formation can take place.

In a simplest embodiment, the insulation layer has a recess on only one side, for example in the case of a rectangular embodiment on a wide side that faces the insulation layer of an adjacent conductor. Alternatively, however, it is also conceivable for the insulation layer to have at least one recess on each of multiple sides, as described. These may be mutually opposite sides, so that if, for example, all conductors have corresponding recesses on opposite sides, two recesses complement one another to form one channel of larger cross-section. In addition, however, the recesses may also lie offset from one another by 90°, so that a first channel is formed between two insulation layers of two adjacent conductors and a second channel is formed between the insulation layer of a conductor and the insulation of the slot base. It is also conceivable for recesses to be formed on three sides or on all four sides, so that a plurality of individual channels or complementary channels are formed. If the recesses lie on opposite sides, they are advantageously configured such that adjacent recesses of two adjacent insulation layers complement one another to form one larger channel.

As described, the insulation layer is preferably a plastic coating that is applied in an extrusion process, with such an extrusion process permitting the formation of the recess, even with a different geometry, in a simple manner. In general, the recess geometry may be polygonal or round, i.e., it may have a polygonal or rounded or curved cross-section. To enlarge the heat transfer surface in the recess, one or more bridge-like protrusions formed from the insulating material may be provided, so that with a relatively wide recess and multiple protrusions, a sort of comb-like structure results.

One advantageous variant of the invention provides that, when the channel is formed between two adjacent insulation layers, a recess is formed only on a side that faces an adjacent insulation layer, with the thickness of the insulation layer being greater on the side on which the recess is formed than on the opposite side. Thus, according to this variant of the invention, the insulation layer is not uniformly thick on all four sides, but rather is relatively thin on three sides, for example, while it is thicker on the fourth side, which lies adjacent to the insulation layer of an adjacent conductor, the recess being formed on this thicker side. This thickness variation is advantageous for keeping the copper fill factor, i.e., the mass of conductor material in the slot, as high as possible.

In addition to the stator itself, the invention relates to an electric motor comprising a stator according to any one of the preceding claims.

BRIEF DESCRIPTION OF THE DRAWINGS

Further advantages and details of the present invention will be apparent from the exemplary embodiments described below and in reference to the drawings. Shown are.

DETAILED DESCRIPTION

Figure 1:
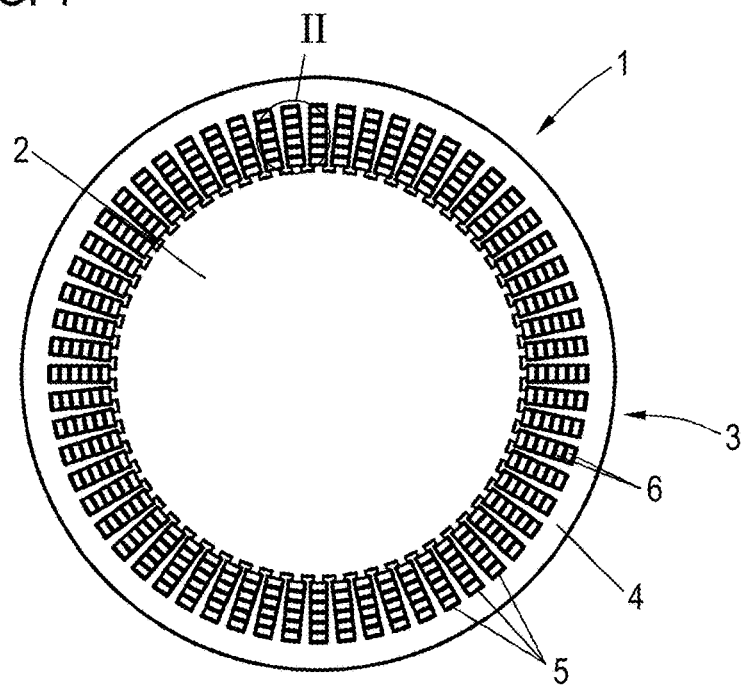
FIG. 1 a schematic diagram of an electric motor according to the invention with a stator according to the invention, FIG. 2 an enlarged detail view of the area II of FIG. 1, FIG. 3 an enlarged detail view of a conductor along with an insulation layer from the assembly of FIG. 2, FIG. 4 the assembly of FIG. 2 in the operating state with coolant located in the channels, FIG. 5 a schematic diagram of a conductor of a second embodiment, and FIG. 6 a view corresponding to FIG. 2 with conductors according to FIG. 5 introduced into the slot.
Figure 2:
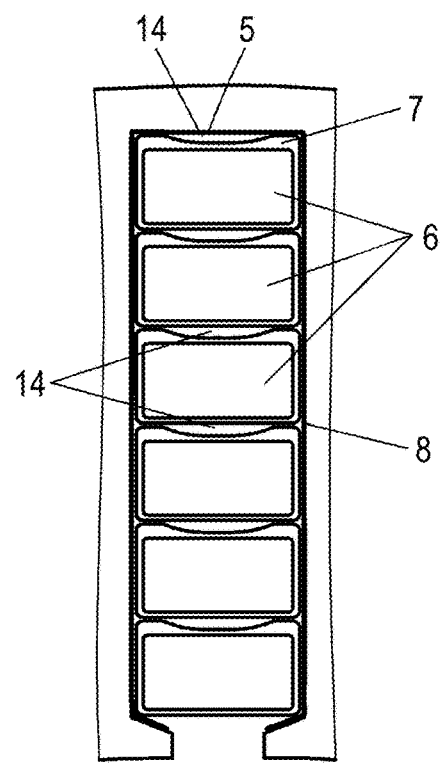

FIG. 1 shows a schematic diagram of an electric motor 1 according to the invention, comprising a rotor 2 and a stator 3 surrounding the rotor 2 and having a stator ring 4, on which a plurality of axially running and radially extending slots 5 are formed. Accommodated in each slot 5 are a plurality of conductors 6, which, as shown in FIG. 2, are rectangular in cross-section and which are arranged in succession radially in the respective slot 5. The conductors 6 are preferably rectangular copper conductors, each of which is completely encased by an insulation layer 7. The slot 5 is also completely covered by a slot base insulation layer 8, so as to ensure that the conductors 6 are insulated from one another and from the stator ring 4, which consists of a laminated core.

Figure 3:
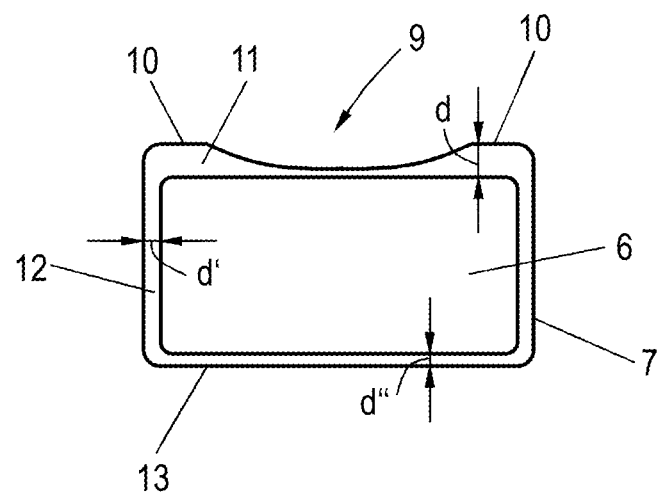

FIG. 3 shows an enlarged partial view of a conductor 6 and the insulation layer 7 encompassing it, which is a plastic insulation layer extruded onto said conductor in a plastic extrusion process. On the upper side 11 shown in FIG. 3, the insulation layer 7 has a recess 9, which in this case is curved, and which extends axially over the entire length of the conductor and is bordered along its edges by corresponding margins 10. On this side 11, the insulation layer 7 is substantially thicker, having a thickness d, which is greater than the thickness d' on the sides 12 of the rectangular conductor 6 and which is substantially greater than the thickness d" on the opposite lower side 13. Such a thickness profile along with the recess 9 can be formed particularly easily in the described plastic process.

As is clear from FIG. 2, the conductors 6 having the insulation layers 7 lie against one another radially, so that the respective upper side 11 of the insulation layer 7 rests with the recess 9 against the substantially thinner lower side 13 of the insulation layer 7 of the adjacent conductor 6. The margins of the upper side 11 then lie close to the lower side 13 of the insulation layer 7 of the adjacent conductor 6, so that in each case a sealed channel 14 is formed between the adjacent insulation layers 7 and extends over the entire length of the conductor bundle. The sides 12 of the insulation layer 7 of each conductor 6 lie close against the slot base insulation 8, so that sealed channels 14 that are fixed in position result, which, since in the example shown in FIG. 3 each conductor 6 has an insulation layer 7 and a recess 9, are formed between the conductors 6. However, a channel 14 is formed between the recess 9 of the topmost conductor and the slot base insulation 8.

Figure 4:
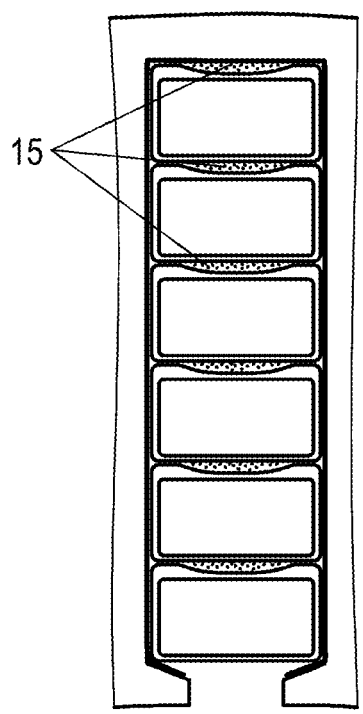

Through each of the channels 14 a coolant 15 can then flow, preferably via a common inlet and outlet, as shown in FIG. 4. In other words, corresponding cooling channels can be integrated directly into the conductor bundle itself via the channels 14, i.e., the heat transfer takes place directly in the region of the heat source and is consequently extremely efficient cooling.

Figure 5:
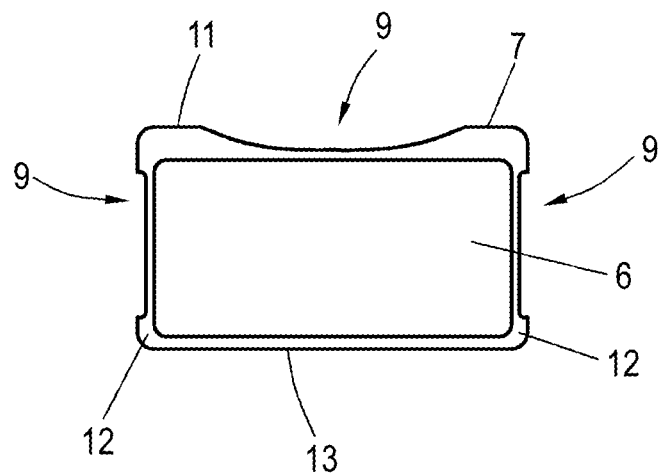

Although only one recess is formed on each insulation layer 7 in the exemplary embodiment according to FIGS. 1-4, it is also conceivable, of course, for multiple recesses 9 to be provided on the insulation layer 7. One example of such a conductor is shown in FIG. 5. The insulation layer 7 of the copper conductor 6, which is rectangular in this case as well, has the known recess 9 on the upper side 11. In this embodiment, corresponding recesses 9 are also formed on the two sides 12 of the insulation layer 7, so that in this example, a total of three recesses 9 are produced.

Figure 6:
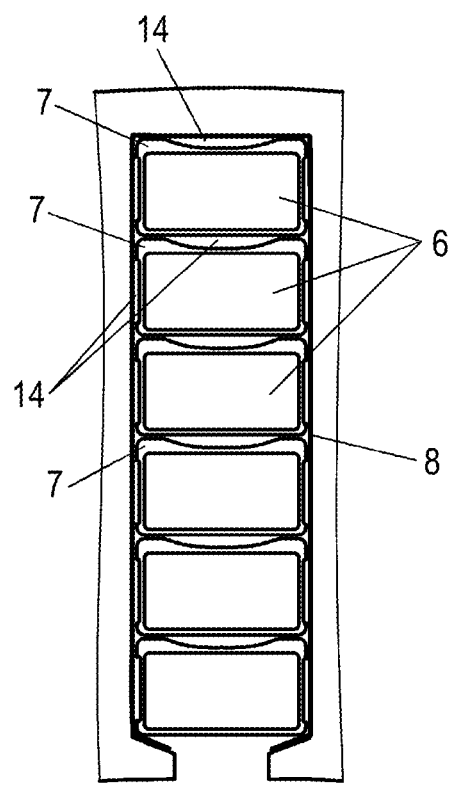

Accordingly, in the schematic diagram of the assembly arrangement shown in FIG. 6, three channels 14 are produced per conductor 6, namely a first channel between the top recess 9 and the bottom side 13 of the adjacent conductor 6, and two additional side channels 14 between the side surfaces 12 and the recesses 9 there and the slot base insulation 8. A channel 14 is likewise produced between the insulation layer 7 of the uppermost conductor 6 and the slot base insulation 8.

In this embodiment of the invention, therefore, the total effective channel cross-section is greater than that of the embodiment of FIG. 2, while conversely, the conductor volume is reduced slightly.

The above exemplary embodiments are merely exemplary in nature. For instance, it is naturally conceivable for the respective recesses to have a different geometry. They may be rectangular, and one or more protruding pieces may be provided in them to enlarge the heat transfer surface, and the like. Of course, the distribution of the recesses 9 on the surfaces 11, 12 and 13 may also be different from what is shown in the exemplary embodiments. The number of conductors 6 in a respective slot 5 may likewise vary, of course. Instead of the six conductors 6 shown, fewer or more, typically up to ten conductors, can also be provided, and the conductors may also be arranged in two parallel rows. In that case, two recesses 9 provided on adjacent sides 12 would complement one another to form one larger channel 14.

In addition, it is not mandatory for the rectangular conductors 6 to be arranged in a slot 5 in a row. It is entirely possible, for example, for two parallel rows of separate conductors 6 having separate insulation layers 7 with correspondingly formed channels 14 to be provided.

The invention claimed is:

1. A stator for an electric motor, comprising:
a stator ring with slots arranged on the inner or outer circumference,
wherein each slot accommodates a plurality of conductors, extending along the slot and having a rectangular cross-section, each conductor being covered by an insulation layer,
wherein for the formation of a plurality of channels through which a coolant can flow, the insulation layer of each of the plurality of conductors has at least one recess extending along the conductor.

2. The stator according to claim 1, wherein the plurality of channels are formed between two adjacent insulation layers of two adjacent conductors or between the insulation layer and a slot insulation layer that lines the slot.

3. The stator according to claim 1, wherein the insulation layer has at least one recess on each of multiple sides.

4. The stator according to claim 3, wherein recesses provided on opposite sides are configured such that adjacent recesses of two adjacent insulation layers complement one another to form one larger channel.

5. The stator according to claim 1, wherein the insulation layer is formed by means of a plastic coating.

6. The stator according to claim 1, wherein each recess has a polygonal or rounded cross-section.

7. The stator according to claim 6, wherein one or more bridge-like protrusions made of the insulating material are provided in the recesses.

8. The stator according to claim 1, wherein, for those of the plurality of channels formed between two adjacent insulation layers, a recess is formed only on a side that faces an adjacent insulation layer, wherein the thickness of the insulation layer on the side on which the recess is formed is greater than on the opposite side.

9. A stator for an electric motor, comprising:
a stator ring with slots arranged on the inner or outer circumference,
wherein each slot accommodates a plurality of conductors, extending along the slot and having a rectangular cross-section, each conductor being covered by an insulation layer,
wherein for the formation of a channel through which a coolant can flow, the insulation layer of at least one of the conductors has at least one recess extending along the conductor,
wherein, for those channels formed between two adjacent insulation layers, a recess is formed only on a side that faces an adjacent insulation layer, and
wherein the thickness of the insulation layer on the side on which the recess is formed is greater than on the opposite side.

10. The stator according to claim 9, wherein each of the plurality of conductors has at least one recess for the formation of a plurality of longitudinal channels.

11. The stator according to claim 9, wherein the channel or channels are formed between two adjacent insulation layers of two adjacent conductors or between the insulation layer and a slot insulation layer that lines the slot.

12. The stator according to claim 9, wherein the insulation layer has at least one recess on each of multiple sides.

13. The stator according to claim 12, wherein recesses provided on opposite sides are configured such that adjacent recesses of two adjacent insulation layers complement one another to form one larger channel.

14. The stator according to claim 9, wherein the insulation layer is formed by means of a plastic coating.

15. The stator according to claim 9, wherein the recess or each recess has a polygonal or rounded cross-section.

16. The stator according to claim 15, wherein one or more bridge-like protrusions made of the insulating material are provided in the recess.

17. A stator for an electric motor, comprising:
a stator ring with slots arranged on the inner or outer circumference,
wherein each slot accommodates a plurality of conductors, extending along the slot and having a rectangular cross-section, each conductor being covered by an insulation layer,
wherein for the formation of a channel through which a coolant can flow, the insulation layer of at least one of the conductors has at least one recess extending along the conductor,
wherein the insulation layer has at least one recess on each of multiple sides, and wherein recesses provided on opposite sides are configured such that adjacent recesses of two adjacent insulation layers complement one another to form one larger channel.

\* \* \* \* \*